Jan. 23, 1951  D. C. HOFFMANN  2,539,191
REGENERATIVE BRAKING CONTROL
Filed Dec. 16, 1949
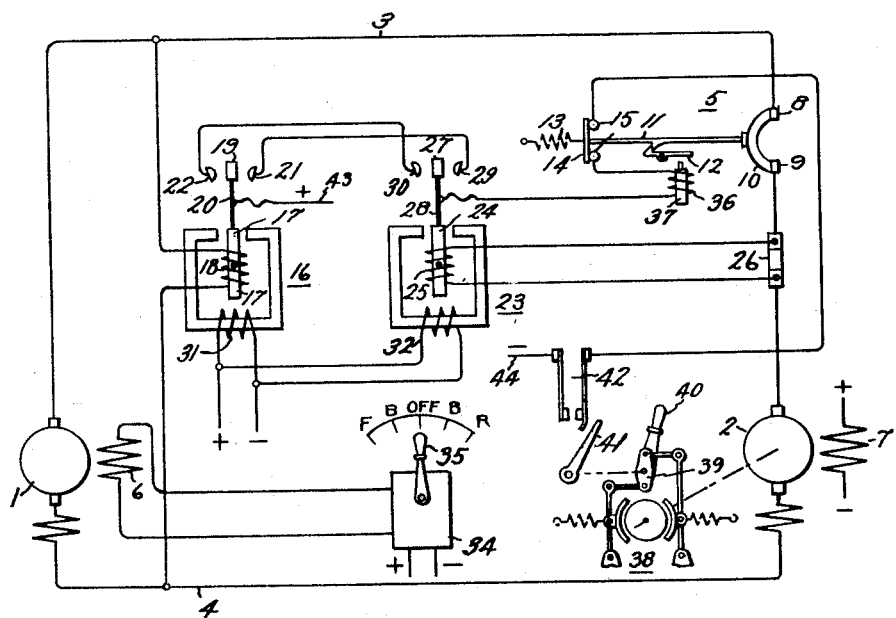
Inventor:
Daniel C. Hoffmann
by Ernest C. Britton
His Attorney.

Patented Jan. 23, 1951

2,539,191

UNITED STATES PATENT OFFICE 2,539,191

REGENERATIVE BRAKING CONTROL

Daniel C. Hoffmann, Lansdowne, Pa., assignor to General Electric Company, a corporation of New York Application December 16, 1949, Serial No. 133,277

1 Claim. (Cl. 318—158)

My invention relates to control systems for motors which may be subjected to overhauling loads and in which a regenerative braking is employed to brake the motor and its load, and which is also provided with a mechanical brake.

The object of my invention is the provision of means for disconnecting the motor from its source of supply if for any reason it continues driving instead of braking the load after the mechanical brake is applied.

According to my invention, a traction towing carriage is driven by a reversible direct current motor having a separately excited shunt field of fixed polarity, the armature of which is supplied by a generator through trolleys. A reversible shunt field excitation of the generator controls the speed of the motor and the direction of motion of the carriage.

A means for determining whether the motor is accelerating or decelerating the carriage when the mechanical brake is applied, includes a voltage directional relay and a current directional relay. The armature of the voltage directional relay is provided with a coil which is connected across the trolleys in parallel with the motor armature. The coil of the current directional relay armature is connected across a shunt in series in the motor circuit. The fields of the relays are excited from a D.-C. source and the relays are each provided with a forward and a reverse stationary contact with corresponding contacts of the relays connected together. A moving contact mounted upon and insulated from an extension of the armature of each relay provides selective engagement of the moving contact with the stationary contacts.

When the carriage is being driven in the forward direction, one of the trolleys is positive and the other negative, causing contact in both relays to be made with the forward stationary contacts. In normal operation when the carriage is to be stopped, an automatic control reduces the voltage of the generator without reversing its direction but causes the current supplied to the motor first to decrease to zero and then to reverse its direction, since the voltage generated by the motor is higher than that supplied by the generator. The motor then pumps power back into the generator, thus regeneratively braking the carriage. After reversal, the voltage directional relay remains connected through the forward contact and the reversal of current in the line causes the current directional relay to open its forward contact and close its reverse contact.

A connection is made from one side of a D.-C. source of power in series with the moving contact of the voltage directional relay, the moving contact of the current directional relay, a trip coil and auxiliary contacts of the circuit breaker, and a switch, to the other side of the D.-C. source. The auxiliary contacts of the circuit breaker operate to close and open with the operation of the main contacts. The switch is closed simultaneously with the operation of a handle to apply a mechanical brake to the carriage. If for any reason there is no change in the direction of the current supplied to the motor after the brake is applied, the moving contact of the current directional relay remains in contact with the forward fixed contact, in which case the D.-C. source energizes the trip coil to break the circuit between the generator and the motor and allow the carriage to be stopped by the mechanical brake alone.

For a better understanding of my invention, reference is made to the accompanying drawing the single figure of which is a simple schematic diagram of an apparatus incorporating my invention.

In reference to the drawing, a generator 1 supplies current to a motor 2 over trolleys 3 and 4 through a circuit breaker 5 connected in the armature circuit of the motor and generator. The generator has a shunt field 6 together with suitable means (not shown) but which may be operated to reverse the direction of current therein to change the polarity of voltage and the direction of current supplied to motor 2, so that motor 2 drives a carriage (not shown) in a forward or reverse direction. Motor 2 is provided with a separately excited shunt field 7 in which the direction of current flow is fixed. Trolley 3 and the armature of motor 2 are respectively connected to stationary contacts 8 and 9 of circuit breaker 5.

A movable contact 10 is mounted upon a rod 11 of the circuit breaker and is held closed against stationary contacts 8 and 9 by a latch 12 to connect generator 1 and motor 2. A spring 13 mounted upon rod 11 biases movable contact 10 from engagement with contacts 8 and 9. The circuit breaker is provided with auxiliary contacts 14 and 15 which are closed when the main contacts are closed.

A voltage directional relay 16 is supplied with an armature 17 having a coil 18 connected in parallel with motor 2 to detect the polarity of the voltage applied thereto. A movable contact 19 is mounted upon and insulated from an extension 20 of armature 17 which is rotatable to move contact 19 to engage a fixed contact 21 when the voltage supplied moves the carriage forward and to engage a fixed contact 22 when the voltage is of opposite polarity.

A current directional relay 23 is provided with an armature 24 having a coil 25 connected across a shunt 26 connected in series between generator 1 and motor 2 to determine the direction of current flowing therebetween. A movable contact 27 is mounted upon and insulated from an extension 28 of armature 24 which is rotatable to move contact 27 to engage a fixed contact 29 when the direction of current flow is such as to drive the carriage forward and to engage a fixed contact 30 when current is flowing in the opposite direction. Relays 16 and 23 are provided with separately excited D.-C. field coils 31 and 32 respectively. Corresponding fixed contacts 21, 29 and 22, 30 are connected together.

The relays 16 and 23 are polarized so that when the carriage is operated in the forward direction, contacts 19, 21 and 27, 29 close due to the polarity of the voltage and the direction of the current being supplied by generator 1.

A master switch 34 reverses the field connections of generator 1 to cause motor 2 to operate in forward or reverse direction. A handle 35 is provided with extreme positions designated "F" for forward and "R" for reverse for operation of motor 2, and a center "Off" position. Each direction has a brake position designated "B" intermediate between the "Off" and the running position.

Circuit breaker 5 is provided with a tripping mechanism which comprises a solenoid 36 having a movable core member 37 positioned to trip latch 12 in response to energization of the coil. A mechanical carriage brake 38 is operated through a link 39 by a handle 40. A finger 41 coaxial with link 39 closes switch 42 as brake 38 is applied. A cam mechanism can be substituted for handle 40 to operate the brake and the switch from the track so that the brake is operated when the carriage reaches a particular position of its travel. A control circuit is connected from one side 43 of a D.-C. source through contacts 19, 21 and 29, 27 through the coil of solenoid 36, auxiliary contacts 14, 15 and switch 42 to the other side 44 of the D.-C. source, or from 43 through contacts 19, 22 and 30, 27 solenoid 36 contacts 14, 15 and switch 42 to 44, depending upon the direction of operation of motor 2.

With the foregoing understanding of the elements and their organization in the control system, the operation of the system itself will readily be understood from the following detailed description of the operation.

When handle 35 is moved from "F" to "B" to stop the carriage during operation of the motor in the forward direction, master switch 34 reduces the excitation of field winding 6 and consequently the voltage across the generator to a relatively low value. As a result, the current supplied to the motor is reduced to zero. Since motor 2 is now being driven by the carriage, the voltage across the motor terminals is higher than the voltage across the generator terminals resulting in a flow of current from the motor to the generator. This reversal of current direction in shunt 26 reverses the excitation of armature coil 25, causing relay 23 to open contacts 27, 29 and to close contacts 27 and 30.

When brake 38 is applied, switch 42 is closed so that if for any reason the current is still flowing from generator 1 towards motor 2 retaining contacts 27 and 29 closed, flow of current between 43 and 44 through solenoid 36 trips circuit breaker 5 allowing the carriage to be stopped by brake 38 alone.

When the carriage is driven in the reverse direction, contacts 19, 22 and 27, 30 are in engagement. Otherwise reverse operation of the device is similar to operation in the forward direction.

While certain specific embodiments have been shown and described, it will, of course, be understood that various modifications may be made without departing from the invention. The appended claim is, therefore, intended to cover any such modifications within the true spirit and scope of my invention.

What I claim as new and desire to secure by Letters of the United States is:

A regenerative braking system comprising a generator and a reversible motor, the armature of said generator being connected in a circuit to supply current to the armature of said motor selectively to operate a load in a forward or reverse direction and regeneratively to brake said load, said motor having a shunt field of fixed polarity and provided with a brake, said generator having a shunt field of reversible polarity to reverse the direction of operation of said motor, means for decreasing the excitation of said generator field during motoring operation of said motor in either direction to prepare for regenerative braking operation of said motor, a circuit breaker having main contacts connectible in said circuit and having tripping means for maintaining said contacts in engaged position and for tripping said contacts out of engagement, a spring for biasing said contacts to the open position, said tripping means being provided with a coil responsive to energization to trip said contacts, auxiliary contacts provided upon said circuit breaker to be engaged upon engagement of said main circuit breaker contacts to prepare an energizing circuit for the coil of said tripping means, a pair of relays each provided with a field of fixed polarity and an armature and having forward and reverse fixed contacts, each of said relays having an armature coil and a movable contact operated by said armature, one of said relays being a voltage directional relay and having its armature coil connected in parallel with said motor armature, the other of said relays being a current directional relay and having its armature coil connected effectively in series with said motor armature, corresponding fixed contacts of said relays being wired together and the contacts of said relays being connected in said energizing circuit so that when said generator furnishes current to effect operation of said motor in one direction said movable contacts engage the fixed contacts corresponding to said direction, and a control switch connected in said energizing circuit, and responsive to the application of said brake for completing said energizing circuit to open said circuit breaker, said current directional relay being responsive to reversal of said armature current to prevent completion of said energizing circuit thereby to permit regenerative braking operation of said motor.

DANIEL C. HOFFMANN.

No references cited.